United States Patent
Cremer

(10) Patent No.: US 8,497,311 B2
(45) Date of Patent: Jul. 30, 2013

(54) SILICONE-CONTAINING POLYISOCYANURATE FOAM

(75) Inventor: Jens Cremer, Munich (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 13/638,903

(22) PCT Filed: Mar. 16, 2011

(86) PCT No.: PCT/EP2011/053974
§ 371 (c)(1),
(2), (4) Date: Oct. 30, 2012

(87) PCT Pub. No.: WO2011/124454
PCT Pub. Date: Oct. 13, 2011

(65) Prior Publication Data
US 2013/0072587 A1    Mar. 21, 2013

(30) Foreign Application Priority Data
Mar. 30, 2010   (DE) .......................... 10 2010 003 477

(51) Int. Cl.
*C08L 83/08*    (2006.01)
*C08G 77/26*    (2006.01)
*C08J 9/04*     (2006.01)

(52) U.S. Cl.
USPC ............................................. 521/137; 528/28

(58) Field of Classification Search
None
See application file for complete search history.

(56) References Cited

U.S. PATENT DOCUMENTS

| 4,350,777 | A   | * | 9/1982  | Henrichs et al. ............... 521/110 |
| 4,758,601 | A   | * | 7/1988  | Haas et al. .................... 521/108 |
| 5,919,441 | A   | * | 7/1999  | Mendolia et al. .......... 424/78.08 |
| 2009/0099291 | A1 | * | 4/2009  | Jia et al. ......................... 524/425 |
| 2010/0261804 | A1 | * | 10/2010 | Yamanaka et al. ............ 521/137 |
| 2010/0267854 | A1 |   | 10/2010 | Cremer et al. |
| 2011/0034574 | A1 |   | 2/2011  | Cremer |
| 2011/0201712 | A1 |   | 8/2011  | Cremer |

FOREIGN PATENT DOCUMENTS

| WO | 2009071510 A1 | 6/2009 |
| WO | 2009130194 A1 | 10/2009 |
| WO | 2010069821 A1 | 6/2010 |

* cited by examiner

*Primary Examiner* — Robert S Loewe
(74) *Attorney, Agent, or Firm* — Brooks Kushman P.C.

(57) ABSTRACT

Polyisocyanurate foams of closed cell structure and low density are obtained by reaction of an amino-functional hyperbranched organopolysiloxane polyol, polyisocyanate, trimerization catalyst, and blowing agent.

9 Claims, No Drawings

SILICONE-CONTAINING POLYISOCYANURATE FOAM

CROSS-REFERENCE TO RELATED APPLICATIONS

This application is the U.S. national phase of PCT Appln. No. PCT/EP2011/053974 filed Mar. 16, 2011 which claims priority to German application 10 2010 003 477.0 filed Mar. 30, 2010, the disclosures of which are incorporated in their entirety by reference herein.

BACKGROUND OF THE INVENTION

1. Field of the Invention

The invention relates to foamable compositions based on organosilicon compounds, to silicone-containing polyisocyanurate foams with low densities, and to processes for their preparation.

2. Description of the Related Art

Despite the fact that in recent decades there has been no lack of intense research activities into improving the flame retardance properties of polymer foams, it has not yet proven possible to establish strongly flame-retarded PU foams on the market.

One relatively successful approach which has emerged to the production of flame-retarded polyurethane foams is polyisocyanurate chemistry. Production of such foams typically involves a reaction of polyisocyanates with compounds having hydrogen atoms that are reactive toward isocyanate groups, such as polypropylene glycols, with the isocyanate index being at least 180. In such a reaction, in the presence of a trimerization catalyst, formation of the urethane structures is accompanied by formation of isocyanurate structures as well. The resulting polyisocyanurate (PIR) foams are, typically, closed-cell, rigid foams, which among all of the types of polyurethane foam exhibit the best fire properties in respect of fire retardance.

Generally speaking, in the production of rigid polyisocyanurate foams, not only blowing catalysts and gel catalysts, usually amines, but also trimerization catalysts are among the catalysts employed. Additionally, catalyst systems consisting of a mixture of different catalysts are found in the prior art. These rigid PIR foams are typically produced using physical and chemical blowing agents. Physical blowing agents used include, for example, chlorofluorocarbons (CFCs), hydrofluorocarbons (HFCs), hydrocarbons, and also liquid carbon dioxide, while chemical blowing agents used are principally water and carboxylic acids.

Despite the fact that the rigid PIR foams already have relatively good fire properties, there is still a great need for improvement, since high levels of added flame retardants are needed in order to obtain optimized fire retardance. Such flame retardants adversely affect the mechanical properties of the resulting foam, and, furthermore, are not always toxicologically acceptable.

It would therefore be desirable to have a rigid foam which is characterized by improved fire properties, has good mechanical properties coupled with low foam densities, and can be used without the addition of toxic flame retardants.

One such route to flame-retarded PU foams is taken in the silicone-polyurethane foams. In such foams, the highly combustible polyol component that is used in standard PU foams is replaced by poorly combustible, OH-terminated siloxanes. Through the use of silicone-polyurethane copolymers, i.e., of polysiloxanes, which also contain polyurethane units and/or urea units, it is possible to develop fireproof foam materials of this kind which have new combinations of properties that are tailored precisely to the particular application.

Reference for this may be made, for example, to WO 2009130194A1, which describes the production of rigid silicone-PIR foams starting from hyperbranched alkylhydroxy-terminated silicone oils and in what is called the "one-shot process".

What is disadvantageous about such processes, however, is the fact that foam structures are no longer completely closed-cell at foam densities below 70 kg·m$^{-3}$. This tendency becomes more and more dominating with decreasing foam densities, and so these foams lose their insulating effect.

SUMMARY OF THE INVENTION

The invention provides foamable compositions which react to form polyisocyanurate foams, and which contain a polyisocyanate, a trimerization catalyst, and an isocyanate-reactive polyorganosiloxane containing a urea group-linked reactive group.

The present invention thus provides foamable compositions containing siloxanes (A) of the formula

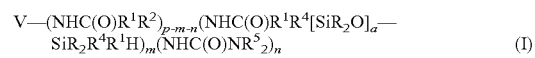

$$V-(NHC(O)R^1R^2)_{p-m-n}(NHC(O)R^1R^4[SiR_2O]_a-SiR_2R^4R^1H)_m(NHC(O)NR^5_2)_n \quad (I)$$

where
V is a p-valent hydrocarbon radical which may contain heteroatoms,
R in each occurrence can be the same or different and is a monovalent, optionally substituted hydrocarbon radical,
$R^1$ in each occurrence can be the same or different and is —O—, —S— or —NR$^3$—,
$R^2$ in each occurrence can be the same or different and represents hydrogen atom and monovalent, optionally substituted hydrocarbon radicals,
$R^3$ is hydrogen atom or monovalent, optionally substituted hydrocarbon radical,
$R^4$ in each occurrence can be the same or different and is a divalent, optionally substituted hydrocarbon radical which can be interrupted by heteroatoms,
$R^5$ in each occurrence can be the same or different and is hydrogen atom or an optionally substituted hydrocarbon radical,
a is an integer not less than 1, preferably in the range from 1 to 1000, more preferably in the range from 5 to 500 and even more preferably in the range from 10 to 100,
p is an integer not less than 2, preferably in the range from 2 to 20 and more preferably 3 or 4, m is an integer not less than 1, preferably in the range from 1 to 19 and more preferably in the range from 1 to 3,
n is an integer not less than 1, preferably in the range from 1 to 19 and more preferably in the range from 1 to 3,
with the proviso that p is not less than m+n,
(B) polyisocyanates, and
(G) trimerization catalysts.

Examples of R are alkyl radicals such as the methyl, ethyl, n-propyl, isopropyl, n-butyl, isobutyl, tert-butyl, n-pentyl, isopentyl, neopentyl, and tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical; alkenyl radicals such as the vinyl and the allyl radicals; cycloalkyl radicals such as the cyclopentyl, cyclohexyl, cycloheptyl and methylcyclohexyl radicals; aryl radicals such as the phenyl and the naphthyl radicals; alkaryl radicals such as the o-, m-, and p-tolyl radicals, xylyl radicals, and ethylphenyl radicals; and aralkyl radicals such as the benzyl radical and the α- and the β-phenylethyl radicals.

Examples of substituted hydrocarbon radicals R are alkoxyalkylene radicals such as the methoxymethylene and ethoxymethylene radicals, hydroxyalkylene radicals such as the 2-hydroxyethylene radical, and aminoalkylene radicals such as the dimethylaminomethylene, diethylaminomethylene, 2-aminoethylene, and N-methylaminoethylene radicals.

The radical R preferably comprises monovalent, optionally substituted hydrocarbon radicals having from 1 to 40 carbon atoms, more preferably hydrocarbon radicals having from 1 to 6 carbon atoms, and in particular comprises the methyl radical.

Examples of $R^3$ are hydrogen and the examples recited for the radical R. The $R^3$ radical is preferably hydrogen.

$R^1$ preferably comprises —O—.

Examples of $R^2$ radicals are hydrogen and also the examples mentioned for the radical R. The $R^2$ radical preferably comprises hydrocarbon radicals having from 1 to 6 carbon atoms and more preferably comprises the methyl radical.

Examples of the $R^4$ radical are the methylene, ethylene, propylene, butylene, pentylene, hexamethylene, methyloxyethylene, i.e. the radical —$CH_2$—O—$CH_2CH_2$—, tolylene, methylenebisphenylene, phenylene, naphthylene, cyclohexylene and isophorone radicals. Preferably $R^4$ comprises divalent, aliphatic hydrocarbon radicals which may be interrupted by heteroatoms, and more preferably propylene, methylene and methyloxyethylene radicals, more particularly methylene and methyloxyethylene radicals and most preferably comprises the methylene radical.

Examples of $R^5$ are the examples recited for R.

$R^5$ preferably comprises hydrogen and optionally hydroxyl-substituted hydrocarbon radicals, more preferably optionally hydroxyl-substituted hydrocarbon radicals, and most preferably alkyl radicals having from 1 to 6 carbon atoms and hydroxyalkyl radicals having from 1 to 6 carbon atoms.

Examples of the radical V are any desired, previously known polyvalent, aliphatic or aromatic hydrocarbon radicals, which may optionally include heteroatoms, such as 1,3,4-benzene radicals, 1,3,5-cyanurate radicals, N,N,N'-biuret radicals, 4,4',4"-triphenylmethane radicals and poly((4-phenyl)coformaldehyde) radicals.

The radical V preferably comprises polyvalent radicals having from 1 to 50 carbon atoms and more preferably having from 6 to 30 carbon atoms.

V preferably comprises polyvalent, aromatic, optionally heteroatom-containing hydrocarbon radicals, more preferably polyvalent aromatic, optionally nitrogen-, oxygen- and phosphorus-containing hydrocarbon radicals, and most preferably polyvalent aromatic, optionally nitrogen- and oxygen-containing hydrocarbon radicals having from 6 to 30 carbon atoms.

In the siloxanes (A) of formula (I) of the present invention, the sum total m+n is preferably equal to p. The siloxanes (A) preferably have a viscosity of from 100 to 10,000 mPas and more preferably 500 to 5000 mPas, measured at 25° C. according to ASTM D 4283.

The siloxanes (A) are preferably hyperbranched.

Examples of siloxanes (A) are

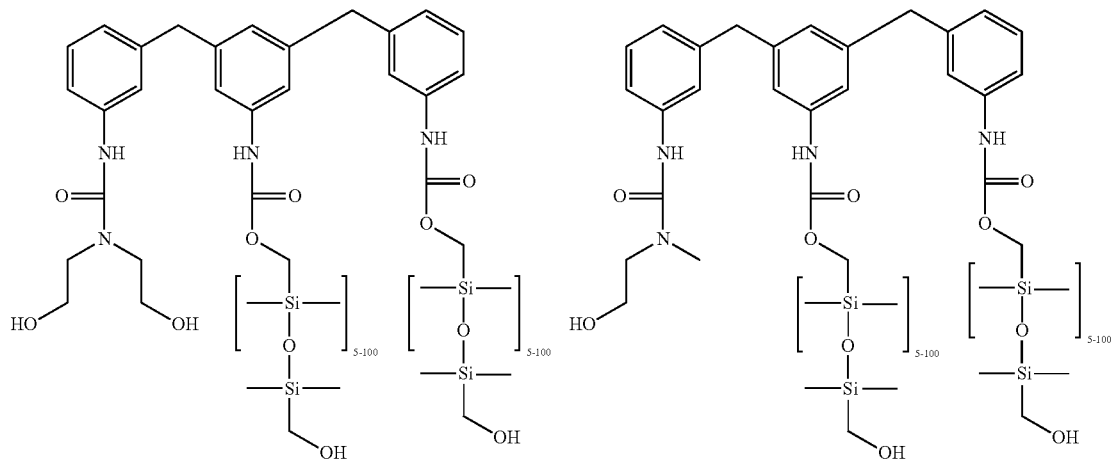

5
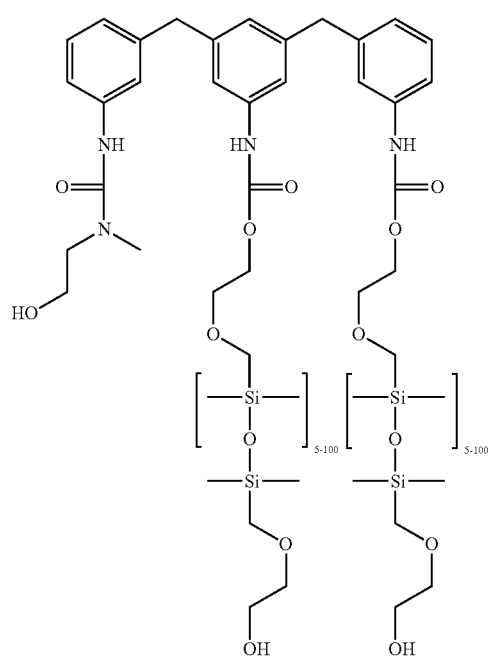
-continued
6
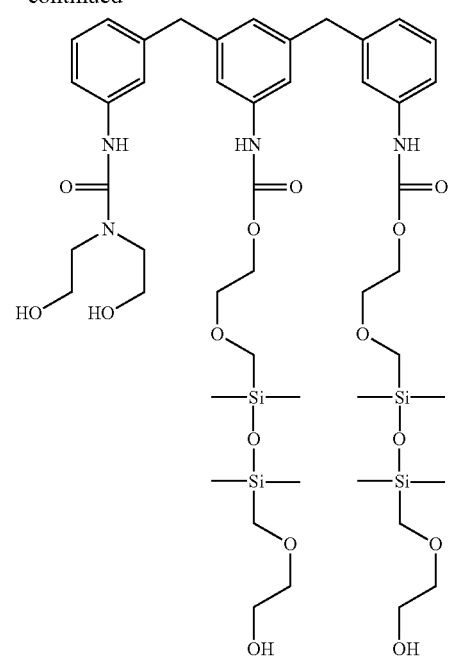
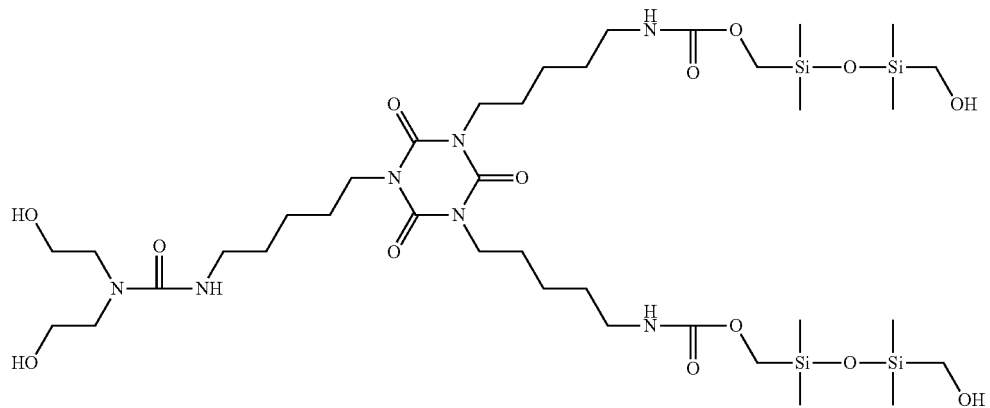
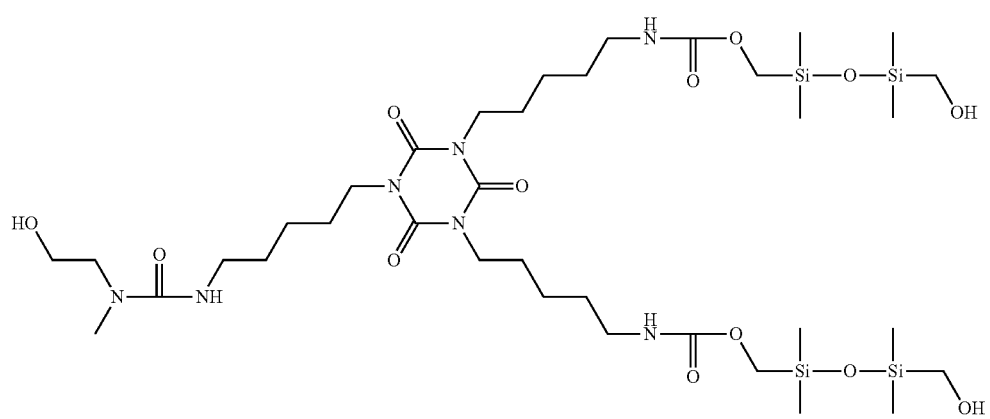

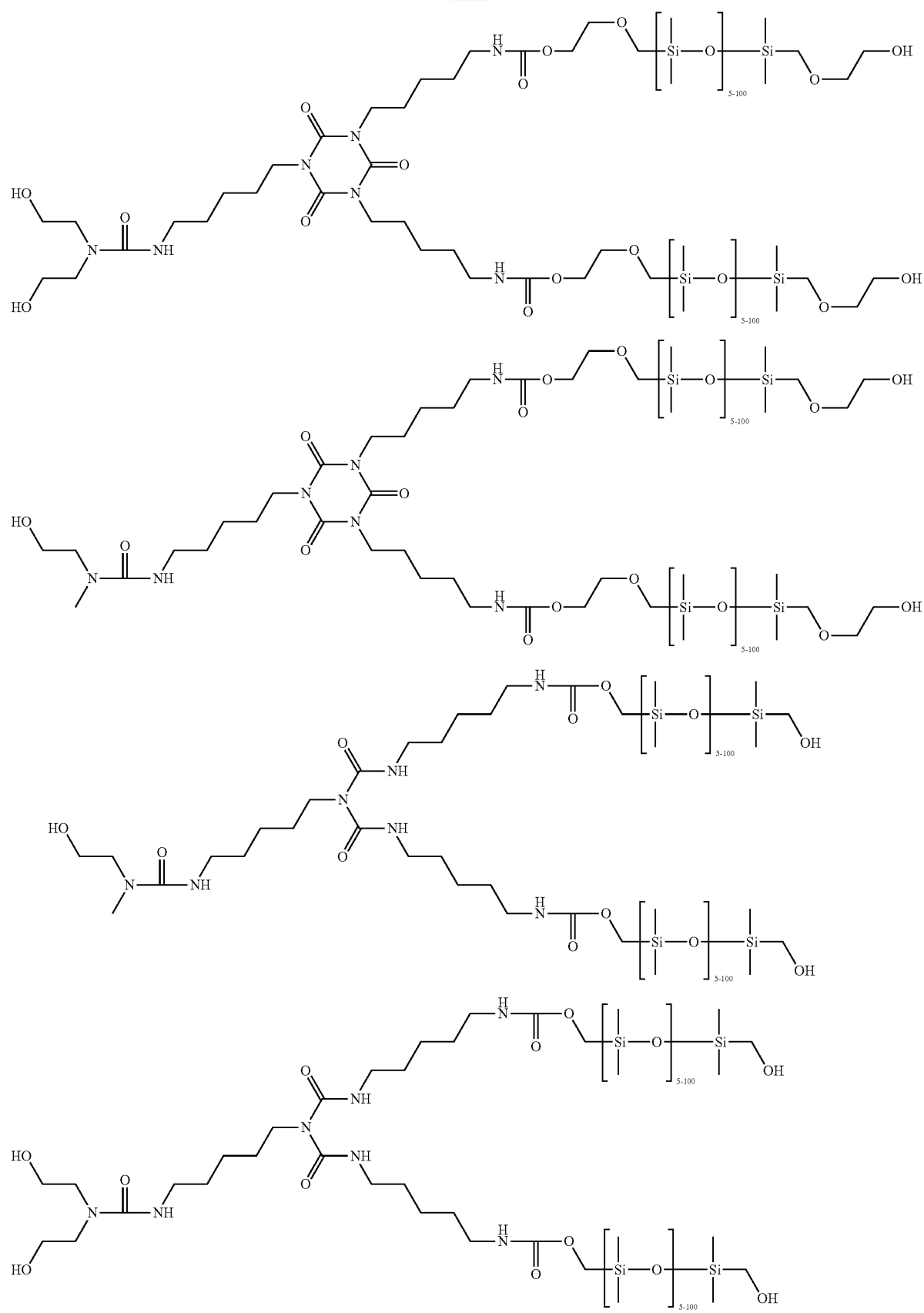

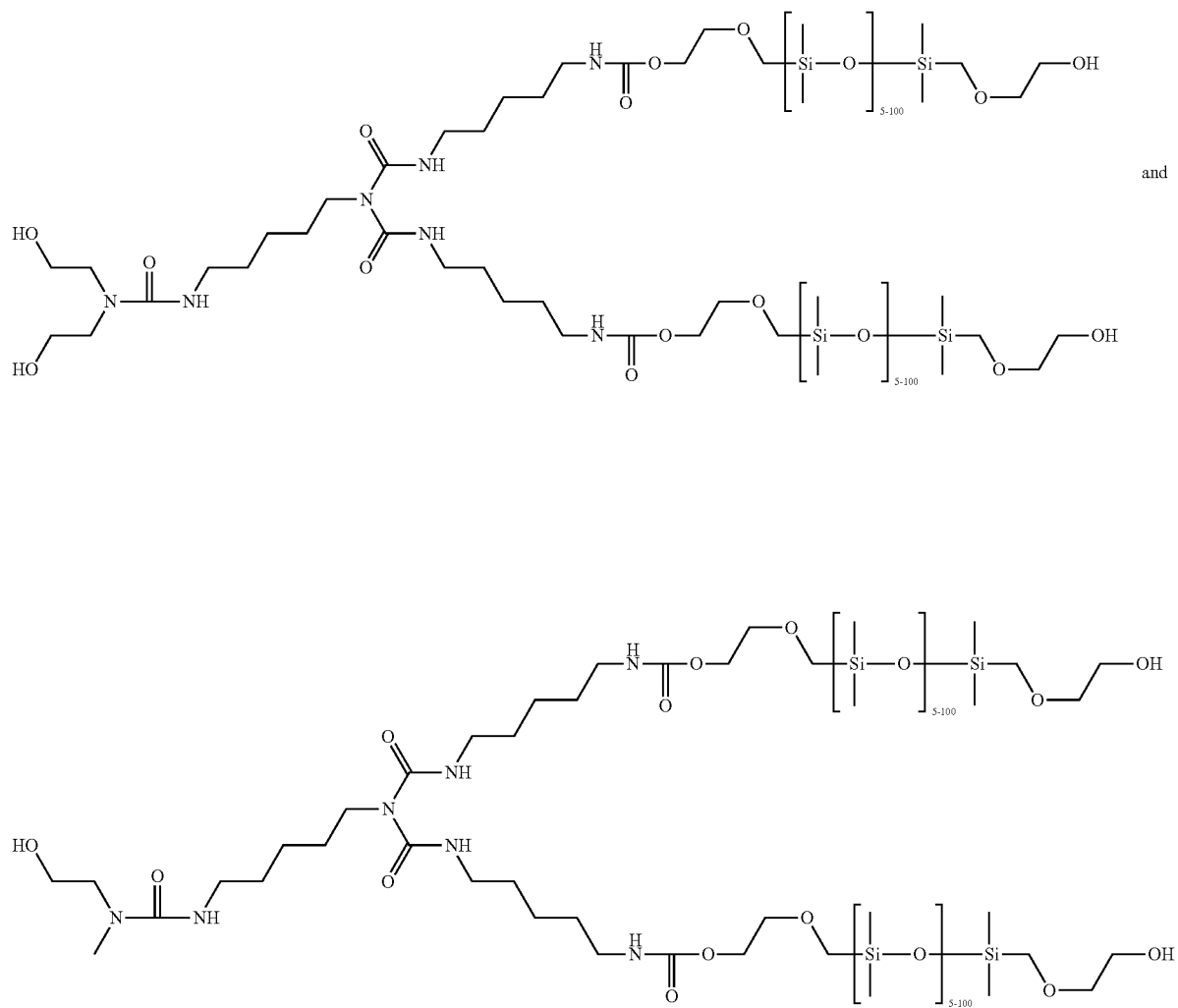
The siloxanes (A) used according to the present invention preferably are:
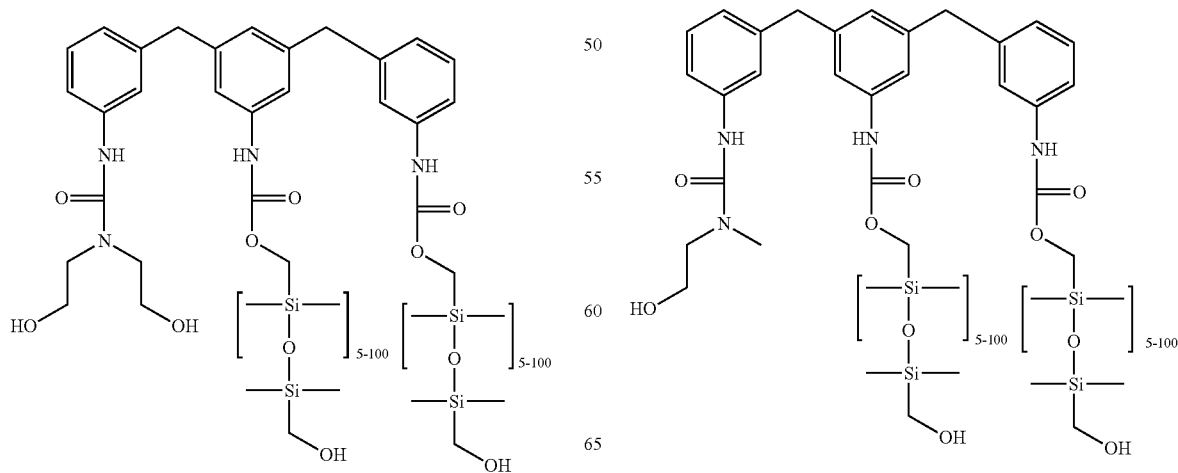

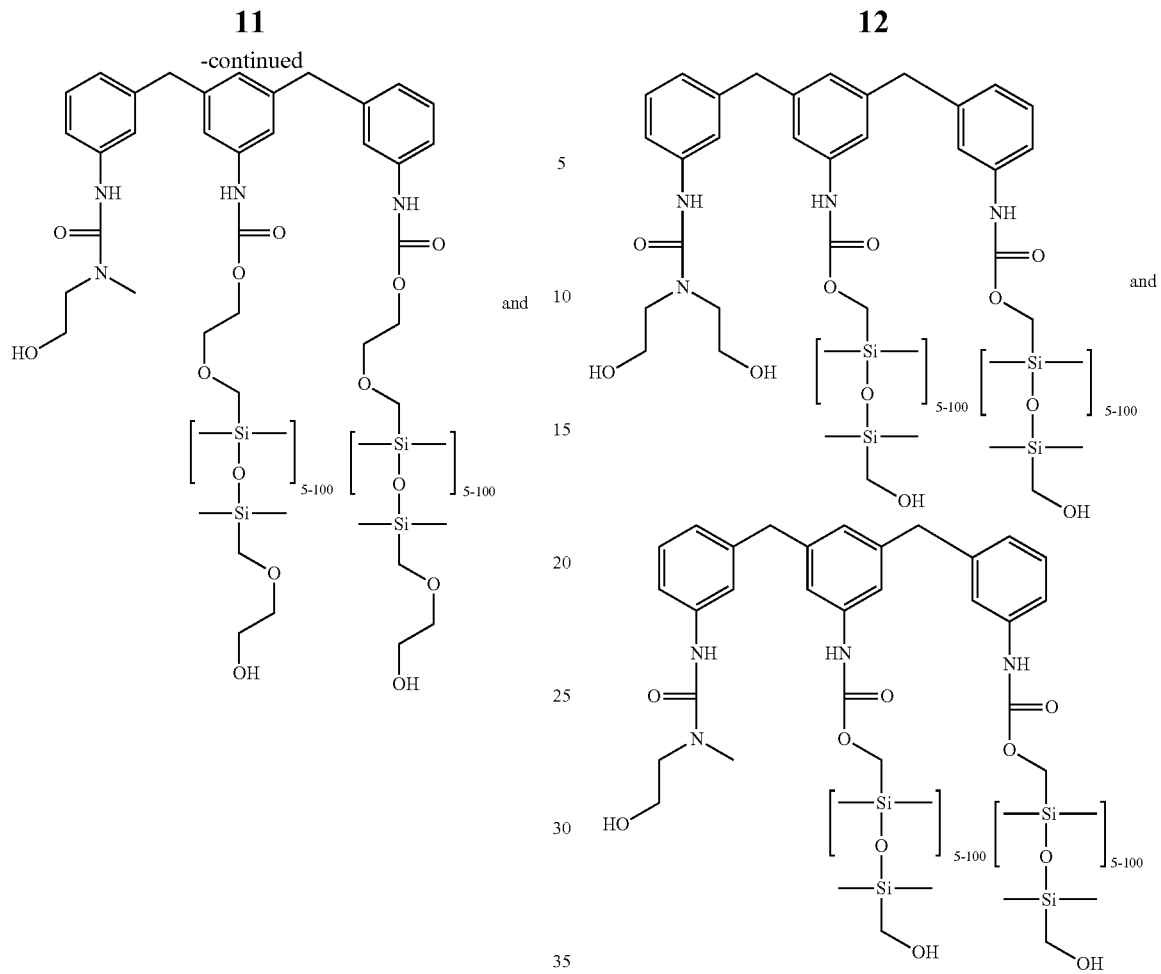

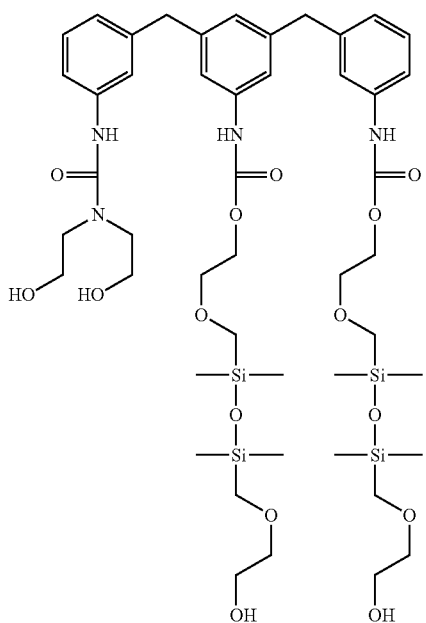 [SMILES: C[Si](C)(COCCO)O[Si](C)(C)COCCOC(=O)Nc1cccc(Cc2cc(Cc3cccc(NC(=O)N(CCO)CCO)c3)cc(NC(=O)OCCOC[Si](C)(C)O[Si](C)(C)COCCO)c2)c1]

The siloxanes (A) used according to the present invention more preferably are:

The siloxanes (A) used according to the present invention are obtainable by commonplace methods in silicon chemistry, and preferably comprise those obtainable by reaction of
(i) a linear α,ω-aminoorganyl-functionalized or α,ω-hydroxyorganyl-functionalized siloxane with
(ii) a polyisocyanate and
(iii) an amine.

Component (i) preferably comprises siloxanes of the formula $$HR^1R^4[SiR_2O]_a\text{—}SiR_2R^4R^1H \qquad (II)$$

where R, $R^1$, $R^4$ and a are each as defined above.
Examples of component (i) are
$HOCH_2\text{—}[SiMe_2O]_{2\text{-}100}\text{—}SiMe_2CH_2OH$,
$HOCH_2\text{—}CH_2\text{—}OCH_2\text{—}[SiMe_2O]_{2\text{-}100}\text{—}SiMe_2CH_2O\text{—}CH_2\text{—}CH_2OH$,
$H_2NCH_2\text{—}[SiMe_2O]_{2\text{-}100}\text{—}SiMe_2CH_2NH_2$,
$H_2NCH_2\text{—}CH_2\text{—}CH_2\text{—}[SiMe_2O]_{2\text{-}100}\text{—}SiMe_2CH_2\text{—}CH_2\text{—}CH_2NH_2$ and
$H_3C\text{—}HNCH_2\text{—}CH_2\text{—}CH_2\text{—}[SiMe_2O]_{2\text{-}100}\text{—}SiMe_2CH_2\text{—}CH_2\text{—}CH_2NH\text{—}CH_3$.
where Me is methyl. The process for preparing the aforementioned linear siloxanes is such that up to 0.1% of all units include branching, as in $MeSiO_{3/2}$ or $SiO_{4/2}$ units for instance.
Component (i) preferably comprises
$HOCH_2\text{—}[SiMe_2O]_{2\text{-}100}\text{—}SiMe_2CH_2OH$ and
$HOCH_2\text{—}CH_2\text{—}OCH_2\text{—}[SiMe_2O]_{2\text{-}100}\text{—}SiMe_2CH_2O\text{—}CH_2\text{—}CH_2OH$,
where $HOCH_2\text{—}[SiMe_2O]_{2\text{-}100}\text{—}SiMe_2CH_2OH$ is particularly preferred.

The siloxanes (i) comprise commercially available products and/or are obtainable by methods commonplace in silicon chemistry.

The polyisocyanates (ii) used according to the present invention comprise all known di- or polyisocyanates.

Preference for use as polyisocyanates (ii) is given to those of the general formula $$V(NCO)_p \qquad (III)$$

where

V and p each have one of the abovementioned meanings.

Examples of polyisocyanates (ii) are diisocyanato-diphenylmethane (MDI), not only in the form of crude or technical MDI but also in the form of pure 4,4' and/or 2,4' isomers or preparations thereof, toluene diisocyanate (TDI) in the form of its various regioisomers, diisocyanatonaphthalene (NDI), isophorone diisocyanate (IPDI), 1,3-bis(1-isocyanato-1-methyl-ethyl)benzene (TMXDI), hexamethylene diisocyanate (HDI), and also polymeric MDI (p-MDI), triphenylmethane triisocyanate, and biuret trimers or isocyanurate trimers of the abovementioned isocyanates.

Polyisocyanates (ii) are preferably used in amounts of from 0.1 to 30 parts by weight, more preferably from 0.1 to 20 parts by weight and most preferably from 1 to 10 parts by weight, all based on 100 parts by weight of siloxane (i).

The amines (iii) used according to the present invention preferably comprise those of the formula $$HNR^5_2 \qquad (IV)$$

where $R^5$ has one of the abovementioned meanings and preferably not more than one $R^5$ radical is hydrogen, and also aliphatic cyclic amines and aromatic cyclic amines which may include additional functional groups such as thiol, hydroxyl or further amino groups.

Examples of amines (iii) are dimethylamine, diethylamine, butylamine, dibutylamine, diisopropylamine, pentylamine, cyclohexylamine, N-methylcyclohexylamine, aniline, morpholine, pyrrolidine, piperidine, imidazole, piperazine, ethylenediamine, N,N'-dimethyl-ethylenediamine, ethanolamine, N-methylethanolamine, diethanolamine, propanolamine, alaniol, and N-methyl(thioethanol)amine.

The amines (iii) preferably comprise aliphatic amines, more preferably pyrrolidine, diethanolamine, ethanolamine and N-methylethanolamine and most preferably diethanolamine, ethanolamine and N-methyl-ethanolamine.

According to the present invention, amines (iii) are preferably used in amounts of from 0.1 to 20 parts by weight, more preferably from 0.1 to 10 parts by weight and most preferably from 0.5 to 5 parts by weight, all based on 100 parts by weight of siloxane (i).

When the starting materials (i), (ii) and (iii) are subjected to the reaction, it is preferable to use organic solvent (iv) and catalysts (v).

Examples of organic solvents (iv) are ethers, more particularly aliphatic ethers such as dimethyl ether, diethyl ether, methyl t-butyl ether, diisopropyl ether, dioxane or tetrahydrofuran; esters, more particularly aliphatic esters such as ethyl acetate or butyl acetate; ketones, more particularly aliphatic ketones such as acetone or methyl ethyl ketone; sterically hindered alcohols, more particularly aliphatic alcohols such as t-butanol; amides such as DMF; aliphatic nitriles such as acetonitrile; aromatic hydrocarbons such as toluene or xylene; aliphatic hydrocarbons such as pentane, cyclopentane, hexane, cyclohexane, and heptane; and chlorinated hydrocarbons such as methylene chloride or chloroform.

The organic solvents (iv) preferably comprise aliphatic ethers, aliphatic ketones or aliphatic nitriles, of which aliphatic ketones are particularly preferred.

When organic solvents (iv) are used, which is preferred, amounts preferably range from 1 to 1000 parts by weight, more preferably from 10 to 500 parts by weight and most preferably from 30 to 200 parts by weight, all based on 100 parts by weight of siloxane (i).

Examples of catalysts (v) are tin compounds such as dibutyltin dilaurate, dioctyltin dilaurate, dibutyltin diacetate, dibutyltin dioctoate, dibutyltin bis(dodecylmercaptide), tin (II) 2-ethylhexanoate; zinc compounds such as zinc(II) 2-ethylhexanoate; bismuth compounds such as bismuth(III) neodecanoate; zirconium compounds such as zirconium tetrakis (2,2,6,6-tetramethylheptane-3,5-dionate); and amines such as 1,4-diazabicyclo[2,2,2]octane and tetramethylguanidine.

The catalysts (v) preferably comprise tin, zirconium or bismuth compounds, of which bismuth compounds are particularly preferred.

When catalysts (v) are used, which is preferred, the amounts involved preferably range from 1 to 1000 weight ppm, more preferably from 10 to 500 weight ppm and more particularly from 50 to 150 weight ppm, all based on the total weight of the reaction mixture.

The components used for reaction may each comprise one type of such a component and also a mixture of two or more types of a particular component.

The reaction preferably comprises a first stage of reacting siloxanes (i) with polyisocyanates (ii) in the presence or absence of solvent (iv) and in the presence or absence of catalyst (v) and a second stage of reacting the resulting reaction mixture with amines (iii).

The reaction is preferably carried out at temperatures of 20 to 100° C., more preferably 30 to 80° C., and at the pressure of the ambient atmosphere, i.e., 900 to 1100 hPa. However, the reaction can also be carried out at higher pressures, for example at 1200 to 10,000 hPa. The reaction is preferably carried out under an inert gas atmosphere, such as nitrogen or argon for example.

The reaction mixture obtained after the reaction has ended can be worked up in any desired previously known manner. Preferably, any organic solvent used is removed, which is more preferably done distillatively and, as far as the technical possibilities allow, completely. The reaction mixture preferably does not contain any unreacted starting materials. When the reaction mixture does contain as yet unreacted starting materials, these preferably remain therein.

Useful isocyanates (B) for the purposes of the present invention include all known di- or polyisocyanates. (B) may comprise for example the isocyanates recited above under (ii), especially in the case of a two-step method of preparation.

Preference for use as polyisocyanates (B) is given to those of the general formula $$Q(NCO)_b \qquad (V)$$

where

Q is a b-functional, optionally substituted hydrocarbon radical and b is an integer of at least 2, preferably in the range from 2 to 10, more preferably 2 to 4 and more particularly 2 to 3.

Preferably, Q comprises optionally substituted hydrocarbon radicals having from 4 to 30 carbon atoms and more preferably hydrocarbon radicals having from 6 to 25 carbon atoms.

It is most preferable for the polyisocyanates (B) which are used according to the present invention to comprise polymeric MDI of the formula

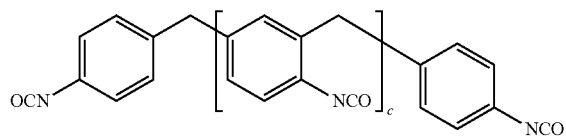

where c is from 0 to 8. Polymeric MDI is obtained for example in the manufacture of diphenylmethane diisocyanate, and is generally a mixture of difunctional MDI and various higher molecular weight MDI oligomers having a higher functionality.

The preparations of the present invention preferably contain isocyanates (B) in amounts of from 0.1 to 500 parts by weight, more preferably from 1 to 250 parts by weight and most preferably from 10 to 150 parts by weight, all based on 100 parts by weight of siloxane (A).

In addition to the siloxanes (A), polyisocyanates (B) and trimerization catalysts (G), the compositions of the present invention may contain further substances, for example fillers (C), emulsifiers (D), physical blowing agents (E), catalysts to speed up foam formation, (F), chemical blowing agents (H) and additives (I).

When fillers (C) are used, the fillers in question may be all nonreinforcing fillers, i.e., fillers having a BET surface area of up to 50 $m^2/g$, such as chalk, or reinforcing fillers, i.e., fillers having a BET surface area of at least 50 $m^2/g$, such as carbon black, MQ resins, precipitated silica or fumed silica. In particular both hydrophobic and hydrophilic fumed silicas represent a preferred filler. One particularly preferred embodiment of the invention uses a hydrophobic fumed silica whose surface has been modified with trimethylsilyl groups. The fillers (C) that are used, more particularly fumed silicas, may take on a variety of functions. Thus they may be used to adjust the viscosity of the foamable mixture. In particular, however, they are able to take on a "support function" in the course of foaming, and thus lead to foams having a better foam structure. Finally, the mechanical properties of the resultant foams may also be decisively improved through the use of fillers (C)—especially through the use of fumed silica.

When the preparations of the invention comprise fillers (C), which is preferred, the amounts are preferably 0.1 to 30 parts by weight, more preferably 0.1 to 20 parts by weight, and most preferably 0.1 to 15 parts by weight, all based on 100 parts by weight of siloxane (A).

In many cases it is of advantage to add emulsifiers (D) to the foamable compositions. As suitable emulsifiers (D), which also serve as foam stabilizers, it is possible, for example, to use all commercial silicone oligomers that are modified with polyether side chains that are useful in producing conventional polyurethane foams.

When emulsifiers (D) are used, which is not preferred, the amounts are preferably up to 6% by weight, more preferably from 0.3% to 3% by weight, based on the total weight of the foamable compositions.

Moreover, the compositions of the invention may also comprise compounds (E) which are able to act as physical blowing agents. As constituent (E) it is preferred to use low molecular mass hydrocarbons such as n-propane, n-butane, n-pentane or cyclopentane; dimethyl ether; fluorinated hydrocarbons such as 1,1-difluoroethane or 1,1,1,2-tetrafluoroethane; or $CO_2$. In this case the production of foam may, if desired, take place exclusively by means of the physical blowing agents (E). Usually, however, the formation of foam takes place through an additional reaction of the isocyanate-functional components in the preparation of the invention with a chemical blowing agent component (H). Consequently, the amount of physical blowing agent (E) required is reduced in order thus to obtain foams having a relatively low density. Component (E) most preferably comprises low molecular mass hydrocarbons, in particular n-pentane.

If the preparations of the invention comprise constituent (E), which is preferable, the amounts are preferably from 0.1 to 30 parts by weight, more preferably 0.1 to 20 parts by weight, and most preferably 0.1 to 15 parts by weight, based in each case on 100 parts by weight of siloxane (A).

Moreover, the foamable compositions of the invention may comprise further catalysts (F) to speed up foam formation by means of the chemical blowing agents (H). Suitable catalysts (F) include organotin compounds, examples of which include dibutyltin dilaurate, dioctyltin dilaurate, dibutyltin diacetate, dibutyltin dioctoate and dibutyltin bis(dodecylmercaptide). Moreover, tin-free catalysts (F) are contemplated as well, for example, heavy-metal compounds or amines. Examples of tin-free catalysts are iron(III) acetylacetonate, zinc(II) octoate, zirconium(IV) acetylacetonate, and bismuth(III) neodecanoate. Examples of amines are triethylamine, tributylamine, 1,4-diazabicyclo[2.2.2]octane, N,N-bis(N,N-dimethyl-2-aminoethyl)methylamine, N,N-dimethylcyclohexylamine, N,N-dimethylphenylamine, bis-N,N-dimethylaminoethyl ether, N,N-dimethyl-2-aminoethanol, N,N-dimethylaminopyridine, N,N,N',N",N"-pentamethyldiethylenetriamine, 1,5-di-azabicyclo[4.3.0]non-5-ene, 1,8-diazabicyclo[5.4.0]-undec-7-ene, N-ethylmorpholine, and N,N'-dimethylamino-pyridine.

Catalyst (F) preferably comprises amines, more preferably N,N,N',N",N"-pentamethyldiethylenetriamine.

The catalysts (F) may be used individually or as mixture. If desired, the catalysts used in the preparation of the siloxanes (A) may also serve simultaneously as catalysts (F) for foam formation.

If catalyst (F) is used, the amounts are preferably from 0.1% to 6.0% by weight, more preferably from 0.3% to 4.0% by weight, based in each case on the total weight of the foamable composition of the invention. The compositions of the invention preferably comprise catalysts (F) when chemical blowing agents (H) are used.

The foamable preparations of the invention comprise trimerization catalysts (G) to initiate and speed up the trimerization of isocyanate groups to isocyanurate groups. Examples of trimerization catalysts (G) are ammonium, alkali metal, or alkaline earth metal salts of carboxylic acids, such as potassium formate, potassium acetate, potassium 2-ethylhexanoate, ammonium formate, ammonium acetate, ammonium 2-ethylhexanoate, 1-(N,N,N-trimethylammonio)propan-2-ol formate, and 1-(N,N,N-trimethylammonio)propan-2-ol 2-ethylhexanoate.

As component (G) it is preferred to use salts of carboxylic acids, more preferably salts of carboxylic acids having 1 to 20 carbon atoms. The carboxylic acids may be linear or branched, substituted or unsubstituted, saturated or unsaturated, aliphatic or aromatic carboxylic acids. Where trimerization catalyst (G) comprises carboxylic acid salts, potassium salts of carboxylic acids are preferred, more particularly potassium 2-ethylhexanoate.

The trimerization catalysts (G) may be used individually or as a mixture, optionally in a mixture with one or more catalysts (F). Trimerization catalyst (G) is preferably used in amounts of 0.1% to 10.0% by weight, more preferably from 0.3% to 6.0% by weight, based on the total weight of the foamable preparation of the invention.

As chemical blowing agents (H) it is possible in principle for not only water but also all compounds having preferably at least one isocyanate-reactive function to be used. Examples of constituent (H) are aminoalkyl- or hydroxy-functional siloxanes other than component (A), monomeric alcohols, monomeric diols such as glycol, propanediol and butanediol, monomeric oligools such as pentaerythritol or trihydroxymethylethane, oligomeric or polymeric alcohols having one, two or more hydroxyl groups such as ethylene glycols or propylene glycols, water, monomeric amines having one, two or more amine functions such as ethylenediamine and hexamethylene-diamine, and also oligomeric or polymeric amines having one, two or more amine functions.

If constituent (H) is used, it preferably comprises hydroxy compounds, with water being particularly preferred. Where constituent (H) is water, the water involved may be of any kind, such as natural waters and chemical waters, for example, and water (H) may be liquid or gaseous, including atmospheric moisture.

If constituent (H) is used, which is preferable, the amounts are preferably 0.1 to 20 parts by weight, more preferably from 0.1 to 15 parts by weight, and most preferably from 0.1 to 10 parts by weight, based on 100 parts by weight of siloxane (A).

As additives (I), furthermore, all additives which are useful in foamable compositions may be used. Examples of additives (I) are cell regulators, thixotropic agents, plasticizers and dyes. In order to improve the fire resistance, moreover, flame retardants may be added to the foamable preparations, examples being phosphorus-containing compounds, especially phosphates and phosphonates, and also halogenated polyesters and polyols or chloroparaffins. It is further possible to also add nonvolatile flame retardants such as melamine or expandable graphite which greatly expands on exposure to flames and in the process seals the surface from further exposure to heat.

If additives (I) are used, which is preferred, the amounts are preferably from 0.1 to 30 parts by weight, more preferably from 0.1 to 20 parts by weight, and most preferably from 0.1 to 15 parts by weight, based on 100 parts by weight of siloxane (A). The preparations of the invention preferably comprise additives (I).

With regard to the components used in accordance with the invention, the components in question may in each case be one kind of such a component or else a mixture of at least two kinds of a respective component.

Preferably the preparations of the invention are those comprising
(A) siloxanes of the formula (I),
(B) polyisocyanates,
(C) optionally, fillers,
(D) optionally, emulsifiers,
(E) optionally, physical blowing agents,
(F) optionally, catalysts to speed up foam formation,
(G) trimerization catalysts,
(H) optionally, chemical blowing agents, and
(I) optionally, additives,
wherein the preparations of the present invention comprise three or more isocyanate groups and also contain at least one blowing agent selected from components (E) and (H), preferably at least (E), in particular (E) in combination with (H).

Aside from components (A) to (I), the preparations of the invention preferably comprise no further constituents.

The preparations of the invention can be prepared by any desired processes known per se, such as simple mixing of the individual components, in which case premixes of individual constituents may also be prepared. Both 1-component systems and 2-component systems may be prepared.

Where the preparations of the invention are provided in the form of 2-component systems, which is preferred, the two components of the foamable preparation of the invention may comprise all of the constituents in any desired combinations and proportions, with the proviso that one component does not simultaneously comprise isocyanate-functional components and trimerization catalyst (G) and also chemical blowing agent (H).

For instance, to prepare the compositions of the invention, preferably a mixture comprising constituent (A), constituent (B), optionally constituent (C), optionally constituent (D), optionally constituent (E) and optionally constituent (I) is prepared, as component 1, and also a component 2 comprising constituent (G), optionally constituent (F) and optionally constituent (H), which are then mixed with one another to produce the foam of the invention.

It is, however, also possible to prepare the compositions of the invention by mixing all of the constituents with one another in one step, which is technically difficult to perform and is consequently not preferred.

The compositions of the invention are preferably liquid to highly viscous and preferably have a viscosity of 250 to 10,000 mPas, more preferably 500 to 5000 mPas, at 25° C. and measured according to ASTM D 4283.

The compositions of the invention preferably serve for the production of foams, more preferably of rigid foams.

The present invention further provides a process for preparing silicone-containing polyisocyanurate foams, characterized in that siloxane (A), polyisocyanate (B) and trimerization catalyst (G) and also at least one blowing agent are mixed and immediately thereafter allowed to react.

In one preferred embodiment of the process according to the present invention, siloxane (A), polyisocyanate (B), physical blowing agent (E), catalyst (F), trimerization catalyst (G) and also optionally (C), optionally chemical blowing agent (H) and optionally (I) are mixed and immediately thereafter allowed to react.

In one particularly preferred embodiment of the process according to the present invention, siloxane (A), polyisocyanate (B), physical blowing agent (E), optionally filler (C) and optionally additives (I) are initially premixed and then mixed with a mixture consisting of catalyst (F), trimerization catalyst (G), chemical blowing agent (H) and optionally additives (I) and immediately thereafter allowed to react.

The process of the invention is carried out at starting temperatures of preferably 0 to 100° C., more preferably 10 to 80° C., and most preferably 15 to 60° C. The heat produced during the reaction preferably remains in the system and contributes to foam formation. In the process of the invention, reaction temperatures of preferably up to 50 to 150° C. are attained.

The process of the invention is preferably carried out under the pressure of the surrounding atmosphere, in other words about 900 to 1100 hPa.

The process of the invention preferably releases gaseous components such as $CO_2$ and gaseous pentane which are largely responsible for the development of the foam structure according to the invention.

In one particular embodiment of the process according to the present invention, the foamable composition may be introduced into a mold which is subsequently closed such that the overpressure produced in foaming can escape. This can be realized for example by the mold having an overpressure valve or small openings, i.e., being incompletely closed via one or more narrow slots for example.

The molds which can be used in the special embodiment of the process of the present invention can be any kind of molds hitherto also used for producing molded foams. Examples of molds of this type are sealable and heatable metallic molds which are equipped with an overpressure valve to allow the displaced air to escape during the foaming process.

Preferably, the molds used for this special embodiment of the present invention are heatable molds composed of a solid material of construction, for example fiberglass-reinforced polyester or epoxy resins and also metals such as steel or aluminum, in which case molds composed of steel and aluminum are preferably hydrophobicized with a priming paste, preferably just before use. Examples of priming pastes with which the molds can be hydrophobicized are high-melting waxes based on hydrocarbons, for example those as commercially available from Chem-Trend Deutschland GmbH, D-Maisach under the trade name of Klüberpur 55-0005.

If desired, the molds can be wetted with a release agent to ensure better demoldability of the foamed structures produced. Examples of such release agents are high-melting waxes dissolved in hydrocarbons, for example those commercially available from Chem-Trend Deutschland GmbH, D-Maisach under the trade name of Klüberpur 41-0057. This special embodiment of the process preferably utilizes the molds used without release agent.

The molds used in this special embodiment of the process are preferably adjusted to temperatures of 0 to 150° C., more preferably 10 to 100° C., and especially 40 to 80° C.

In the special embodiment of the process, the expansion of the foam in the course of its formation is limited by the mold used, i.e., the mold is "overpacked". This overpacking preferably typically amounts to between 20% by volume and 100% by volume. Typical fill levels for a target foam density of 50 kg/m$^3$ preferably amount to 5% by volume.

The invention further provides foams obtainable by reaction of siloxanes (A), polyisocyanate (B) and trimerization catalyst (G) with at least one blowing agent. The foams of the present invention include isocyanurate structures as well as urethane structures, and are notable for a fine, closed-cell foam structure, have excellent mechanical properties and are dimensionally stable and are not flexible. The foams preferably have a density of 10 to 500 kg/m$^3$, more preferably 15 to 300 kg/m$^3$ and especially 20 to 200 kg/m$^3$, all determined at 25° C. and 1013 hPa.

The foams of the present invention can be used wherever polyisocyanurate foams have also be used to date. They are more particularly useful for thermal and acoustical insulation.

The foamable compositions of the present invention have the advantage of being very simple to process using existing methods from PU technology, and the further advantage that silicone-polyurethane foams of low density are obtainable by the one-shot method.

The foamable compositions have yet further the advantage that completely closed-cell rigid foams are obtainable at foam densities below 50 kg·m-3.

The compositions of the invention have the advantage that they are obtainable using readily commercially available starting materials, are readily processable and can be obtained at low viscosity.

The preparations of the present invention have the advantage that rigid silicone-polyisocyanurate foams of low density are obtainable.

The present invention process for producing polyisocyanurate foams has the advantage of being simple to carry out.

The foams of the present invention further have the advantage of being rigid and of extremely low flammability, and the further the advantage of having high mechanical strengths, particularly combined with low foam densities.

In the examples below, all parts and percentage data, unless indicated otherwise, are by weight. Unless indicated otherwise, the examples below are carried out under the pressure of the ambient atmosphere, in other words at about 1000 hPa, and at room temperature, in other words about 20° C., or at a temperature which comes about when the reactants are combined at room temperature without additional heating or cooling. All of the viscosity data given in the examples are intended to be based on a temperature of 25° C.

In the examples below, the following ingredients were used:

MDI 2.9: polymeric MDI having a functionality of 2.9 (commercially available under the designation Suprasec® 2085 from Huntsman Polyurethanes, D-Deggendorf);

MDI 2.2: polymeric MDI having a functionality of 2.2 (commercially available under the designation Suprasec® 2647 from Huntsman Polyurethanes, D-Deggendorf);

Amine catalyst: N,N,N',N'',N''-pentamethyldiethylene-triamine;

Trimerization catalyst: potassium 2-ethylhexanoate, 75% by weight strength in diethylene glycol.

Expandable graphite: commercially available under the designation "EX-EF-80-SC" from NGS Naturgraphit GmbH, D-Leinburg.

Comparative Example 1

200.00 g of a linear organopolysiloxane of the formula HO—CH$_2$—[Si(CH$_3$)$_2$—O]$_{12}$Si(CH$_3$)$_2$—CH$_2$—OH and 20.8 g of MDI 2.9 were reacted in 400 ml of absolute acetone under an atmosphere of inert gas. The reaction was catalyzed with 80 mg of bismuth(III) neodecanoate and stirred at 50° C. for 1 hour. After the reaction had ended, the reaction mixture was freed of solvent at a pressure of 10 hPa to obtain 221 g of a yellowish hyperbranched siloxane as pure substance.

Next 200 g of this hyperbranched siloxane obtained were first processed with 160 g of MDI 2.2 and 30.0 g of n-pentane into a homogeneous emulsion using a high-speed KPG stirrer. Next a mixture consisting of 1.0 g of water, 0.50 g of amine catalyst and 4.2 g of trimerization catalyst was quickly added and again a high-speed KPG stirrer was used to emulsify to a homogeneous mixture. After about 20 seconds an exothermic reaction ensued with foam development. Foam production was complete after approximately a further 120 seconds. The result was a yellowish, rigid foam having a density of 50 kg/m$^3$ and a relatively coarse and open-cell structure.

Example 1

200.00 g of a linear organopolysiloxane of the formula HO—CH$_2$—[Si(CH$_3$)$_2$—O]$_{12}$Si(CH$_3$)$_2$—CH$_2$—OH and 23.6 g of MDI 2.9 were reacted in 400 ml of absolute acetone under an atmosphere of argon. The reaction was catalyzed with 60 mg of bismuth(III) neodecanoate and stirred at 50° C. After a reaction time of one hour, first 3.0 g of diethanolamine were gradually added dropwise and then the reaction mixture thus obtained was freed of solvent at a pressure of 10 hPa.

Next 200 g of this hyperbranched siloxane obtained were first processed with 185 g of MDI 2.2 and 13.0 g of n-pentane into a homogeneous emulsion using a high-speed KPG stirrer. Next a mixture consisting of 1.0 g of water, 0.50 g of amine catalyst and 4.20 g of trimerization catalyst was quickly added and again a high-speed KPG stirrer was used to emulsify to a homogeneous mixture. After about 10 seconds an exothermic reaction ensued with foam development. Foam production was complete after approximately a further seconds. The result was a yellowish, rigid foam having a density of 50 kg/m³ and a very fine and closed-cell structure.

Example 2

200.00 g of a linear organopolysiloxane of the formula HO—CH$_2$—[Si(CH$_3$)$_2$—O]$_{12}$Si(CH$_3$)$_2$—CH$_2$—OH and 23.6 g of MDI 2.9 were reacted in 400 ml of absolute acetone under an atmosphere of argon. The reaction was catalyzed with 60 mg of bismuth(III) neodecanoate and stirred at 50° C. After a reaction time of 1 hour, first 3.0 g of diethanolamine were gradually added dropwise and then the reaction mixture thus obtained was freed of solvent at a pressure of 10 hPa.

Next 200 g of this hyperbranched siloxane obtained were first processed with 185 g of MDI 2.2 and 18.0 g of n-pentane into a homogeneous emulsion using a high-speed KPG stirrer. Next a mixture consisting of 1.0 g of water, 0.50 g of amine catalyst and 4.20 g of trimerization catalyst was quickly added and again a high-speed KPG stirrer was used to emulsify to a homogeneous mixture. After about 10 seconds an exothermic reaction ensued with foam development. Foam production was complete after approximately a further seconds. The result was a yellowish, rigid foam having a density of 40 kg/m³ and a very fine and closed-cell structure.

Example 3

200.00 g of a linear organopolysiloxane of the formula HO—CH$_2$—[Si(CH$_3$)$_2$—O]$_{12}$Si(CH$_3$)$_2$—CH$_2$—OH and 23.6 g of MDI 2.9 were reacted in 400 ml of absolute acetone under an atmosphere of argon. The reaction was catalyzed with 60 mg of bismuth(III) neodecanoate and stirred at 50° C. After a reaction time of 1 hour, first 3.0 g of diethanolamine were gradually added dropwise and then the reaction mixture thus obtained was freed of solvent at a pressure of 10 hPa.

Next 200 g of this hyperbranched siloxane obtained were first processed with 185 g of MDI 2.2, 10 g of expandable graphite and 18.0 g of n-pentane into a homogeneous emulsion using a high-speed KPG stirrer. Next a mixture consisting of 1.0 g of water, 0.50 g of amine catalyst and 4.20 g of trimerization catalyst was quickly added and again a high-speed KPG stirrer was used to emulsify to a homogeneous mixture. After about seconds an exothermic reaction ensued with foam development. Foam production was complete after approximately a further 90 seconds. The result was a dark gray, rigid foam having a density of 40 kg/m³ and a very fine and closed-cell structure.

The invention claimed is:

1. A foamable composition, comprising siloxane(s) (A) of the formula

where

V is a p-valent hydrocarbon radical optionally containing heteroatoms,

R each individually is a monovalent, optionally substituted hydrocarbon radical, R¹ each individually is —O—, —S— or —NR³—, R² each individually is hydrogen or a monovalent, optionally substituted hydrocarbon radical, R³ each individually is hydrogen or a monovalent, optionally substituted hydrocarbon radical, R⁴ each individually is a divalent, optionally substituted hydrocarbon radical optionally interrupted by heteroatoms, R⁵ each individually is hydrogen or an optionally substituted hydrocarbon radical, a is an integer not less than 1, p is an integer not less than 2, m is an integer not less than 1, n is an integer not less than 1, with the proviso that p is not less than m+n;

(B) polyisocyanates; and (G) trimerization catalysts.

2. The foamable composition of claim 1, wherein p is equal to m+n.

3. The foamable composition of claim 2, wherein polyisocyanate (B) has the formula

where

Q is a b-functional, optionally substituted hydrocarbon radical, and b is an integer of at least 2.

4. The foamable composition of claim 1, wherein polyisocyanate (B) has the formula

where

Q is a b-functional, optionally substituted hydrocarbon radical, and b is an integer of at least 2.

5. The foamable composition of claim 1, wherein salts of carboxylic acids are used as component (G).

6. The foamable composition of claim 1, wherein trimerization catalyst (G) is used in amounts of 0.1 to 10.0% by weight, based on the total weight of the foamable composition.

7. The foamable composition of claim 1, comprising (A) siloxanes of formula (I), (B) polyisocyanates, (C) optionally fillers, (D) optionally emulsifiers, (E) optionally physical blowing agents, (F) optionally catalysts to speed up foam formation, (G) trimerization catalysts, (H) optionally chemical blowing agents, and (I) optionally additives, wherein the compositions of the present invention comprise on average three or more isocyanate groups and also contain at least one blowing agent (E) and/or (H).

8. A process for preparing silicone-containing polyisocyanurate foams, comprising mixing and reacting a foamable composition of claim 1.

9. A foam obtained by reaction of a foamable composition of claim 1 and with at least one blowing agent.

* * * * *